United States Patent
Thorp et al.

[11] Patent Number: 5,914,665
[45] Date of Patent: Jun. 22, 1999

[54] COVER FOR SURFACE MOUNTED ALARM UNIT

[75] Inventors: Edward Thorp, Joliet; Douglas J. Anderson, South Elgin; Curtis Davidson, Oswego, all of Ill.

[73] Assignee: Pittway Corporation, Chicago, Ill.

[21] Appl. No.: 08/838,002

[22] Filed: Apr. 14, 1997

[51] Int. Cl.[6] .................................................. G08B 3/00
[52] U.S. Cl. ................................... 340/691.1; 340/693.9; 174/48; 174/49; 174/50
[58] Field of Search .............................. 340/691.1, 693.9, 340/521, 691.4, 691.5, 693.5; 174/48, 49, 50, 17 R; 439/207

[56] References Cited

U.S. PATENT DOCUMENTS

| | | | |
|---|---|---|---|
| 4,090,178 | 5/1978 | Norris | 340/691 |
| 4,209,776 | 6/1980 | Frederick | 340/541 |
| 4,433,328 | 2/1984 | Saphir et al. | 340/555 |
| 4,489,308 | 12/1984 | Logan, Jr. et al. | 340/691 |
| 4,796,018 | 1/1989 | Nakanishi et al. | 340/691 |
| 4,797,507 | 1/1989 | Lofving | 174/48 |
| 4,896,145 | 1/1990 | Lewkowicz | 340/693 |
| 4,952,157 | 8/1990 | Hudson et al. | 439/92 |
| 5,166,476 | 11/1992 | Stumm | 174/65 R |
| 5,349,134 | 9/1994 | Russell | 174/48 |
| 5,434,356 | 7/1995 | Zekowski | 174/48 |
| 5,442,132 | 8/1995 | Sandell et al. | 174/48 |
| 5,560,101 | 10/1996 | Sandell et al. | 174/48 |
| 5,598,139 | 1/1997 | Karim et al. | 340/691 |
| 5,602,522 | 2/1997 | Pacelli | 340/691 |
| 5,673,022 | 9/1997 | Patel | 340/691 |
| 5,773,760 | 6/1998 | Stark et al. | 174/66 |

*Primary Examiner*—Jeffery A. Hofsass
*Assistant Examiner*—Sihong Huang
*Attorney, Agent, or Firm*—Rockey. Milnamow & Katz, Ltd.

[57] ABSTRACT

A plastic cover covers a surface-mounted junction box which delivers wires to an alarm unit or emergency light or the like which is mounted to the cover. The cover is connected to the junction box by screws which engage threaded holes provided by the junction box. The cover can be mounted to either a single wide junction box or a double wide junction box and provides corresponding holes for connection to either box. The alarm devices can be connected to the cover directly by screws or by a combination of a single screw and a tab which is received into a slot on the cover. The cover and alarm unit together form an architecturally attractive cover for an otherwise industrial appearing junction box. When the cover is attached to the junction box, the box no longer can be seen. The covers can be color coded for a particular alarm service, such as fire, weather warnings, or other emergency conditions.

34 Claims, 5 Drawing Sheets

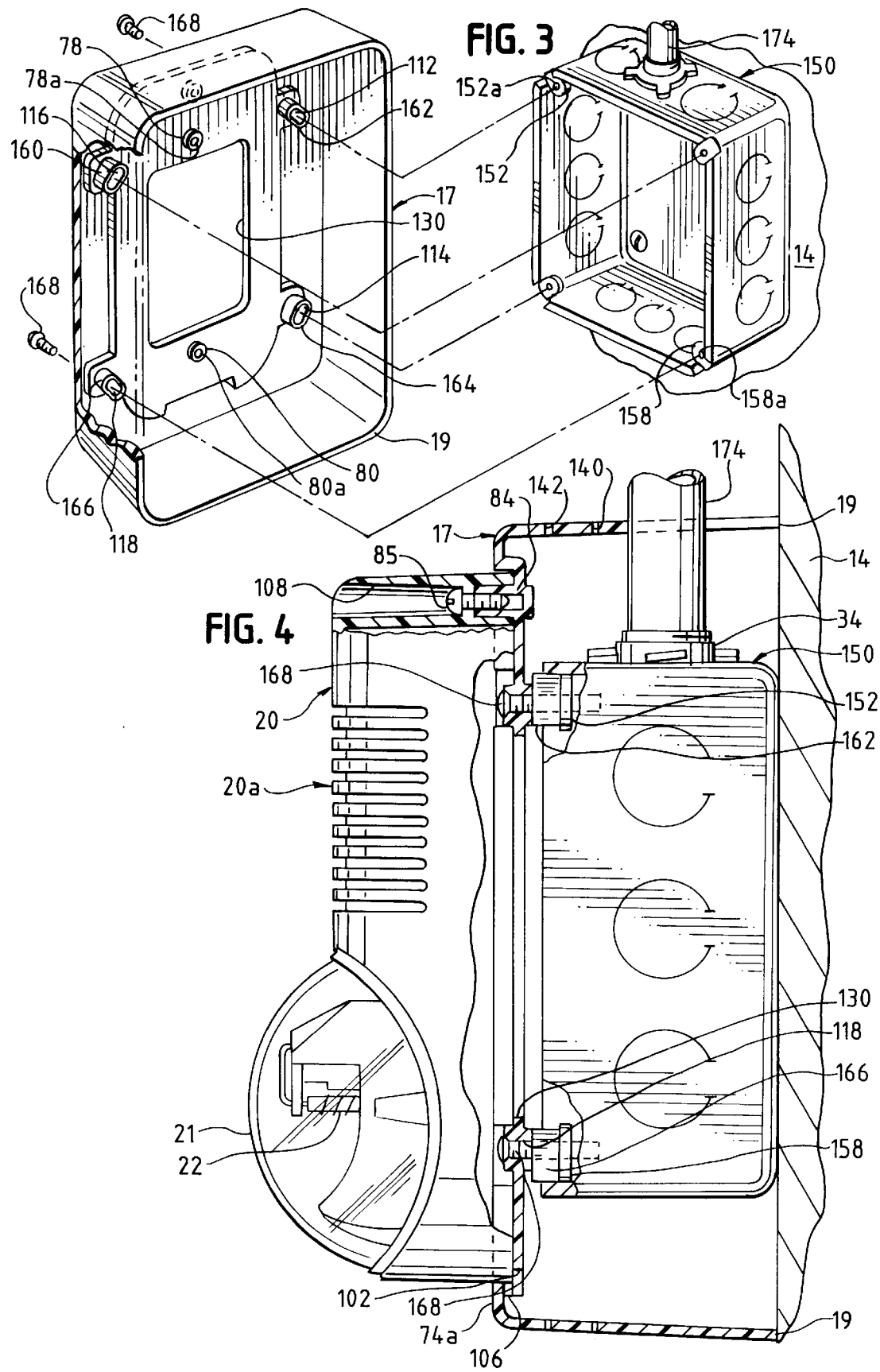

5,914,665

COVER FOR SURFACE MOUNTED ALARM UNIT

FIELD OF THE INVENTION

The present invention relates to surface-mounted alarm units and associated devices. More particularly it relates to a surround or cover for mounting an alarm indicating unit to a surface-mounted electrical junction box.

BACKGROUND OF THE INVENTION

For purposes of safety and security, alarm or security related electric devices can be positioned throughout a building or structure. The devices can constitute detectors such as smoke detectors, or can be annunciators such as audible fire and security alarms, or can include emergency lights.

The detectors can include motion detectors or other intruder alarms. Additionally, other local area monitoring devices which sense an ambient condition or provide a local alarm can be mounted at locations throughout a building or other structure.

In the case of a building having unfinished walls, such as a warehouse, such devices are typically attached to surface mounted electric wire junction boxes. These boxes are connected by surface mounted conduits to a central location. The conduits carry signal wires between the central location and the local electrical device, such as the alarm unit or detector.

The alarm units are typically installed by two screws which engage standard screw holes provided on top and bottom sides of the open face of a respective junction box. Although such mounting may be adequate to support the alarm unit, it would be desirable to provide a cover or enclosure which integrates the alarm unit and the respective surface mounted junction box into a unitary mounting configuration. It would be desirable to provide a cover or enclosure which by its presence mounted to the junction box designates the junction box as being dedicated to a particular safety or security system. It would also be desirable to provide a cover which is installable at either a single or double wide junction box without leaving gaps between the cover and the junction box.

SUMMARY OF THE INVENTION

A cover or enclosure is attachable to a surface mounted junction box that is otherwise exposed to view. The cover includes ports for ingress and egress of surrounding conduits which are connected into the junction box.

A screw attachment or arrangement is provided for connecting the cover to the standard mounting screw holes of the junction box. The cover provides an easy mounting arrangement for an alarm unit or other electrical device to be attached thereto.

The cover is advantageously designed to mount an alarm unit, or other electrical device onto the junction box and to present a unitary appearance therewith. When so mounted, the junction box is not visible.

The cover of the present invention is advantageously a one-piece, molded plastic structure. The cover can be color coded for its service, such as a very visible red or yellow fire-alarm-color for fire protection or alarm devices. Additionally, different colors can represent different emergency situations. For example, red alarm covers can be allocated for fire alarms, green alarm covers can be allocated for tornado warning, and blue alarm covers for a "take cover immediately" warning. Other colors can be allocated for warning of the presence of excessive concentration of toxic or explosive gas, or other emergency situations.

The invention also encompasses a cover which can interchangeably receive either an audible alarm unit or an emergency strobe light. The cover can include a slot and screw hole arrangement for easy attachment of a compatibly fashioned alarm unit which provides a tab received into the slot ants a screw engaged by the screw hole. This arrangement provides for a quick and easy installation or exchange of an alarm unit, emergency light or other electrical device into a preinstalled cover. Additionally, the screws which connect the cover to the junction box can be covered by the respective alarm unit, or emergency light thereby improving the overall appearance of the assembly.

In addition to being architecturally appealing, the cover is also functional. When the alarm unit or emergency light are removed from the cover, the cover provides an enclosure and protection to signal wires held within the otherwise open junction box. Also unlike the relatively smaller junction box, the cover provides a mounting surface which is larger than the alarm unit mounted thereto which provides a stable and secure mounting arrangement. Once installed onto the cover, no portions of the alarm unit overhang the cover which avoids an exposed edge vulnerable to prying the alarm unit off the junction box by vandals.

While the alarm unit or emergency light is being exchanged or repaired, or during construction, the conduit and junction box is clearly designated as dedicated to signal wires for alarms to reduce any confusion between signal conduits and junction boxes and electrical power conduits and junction boxes. In this way, the alarm system components can be more clearly demarcated.

In addition to screws, in an alternate embodiment the cover can be attached using other types of fasteners. In this regard, snap-fit fasteners can be used.

Other features and advantages of the present invention will become readily apparent from the following detailed description, the accompanying drawings, and the appended claims.

BRIEF DESCRIPTION OF THE DRAWINGS

FIG. 3 is an exploded perspective view of a portion of the present invention installed on a double wide surface mounted junction box;

FIG. 4 is a partial sectional view of the present invention installed on the surface mounted junction box shown in FIG. 2;

DETAILED DESCRIPTION OF THE PREFERRED EMBODIMENTS

Figure 1:
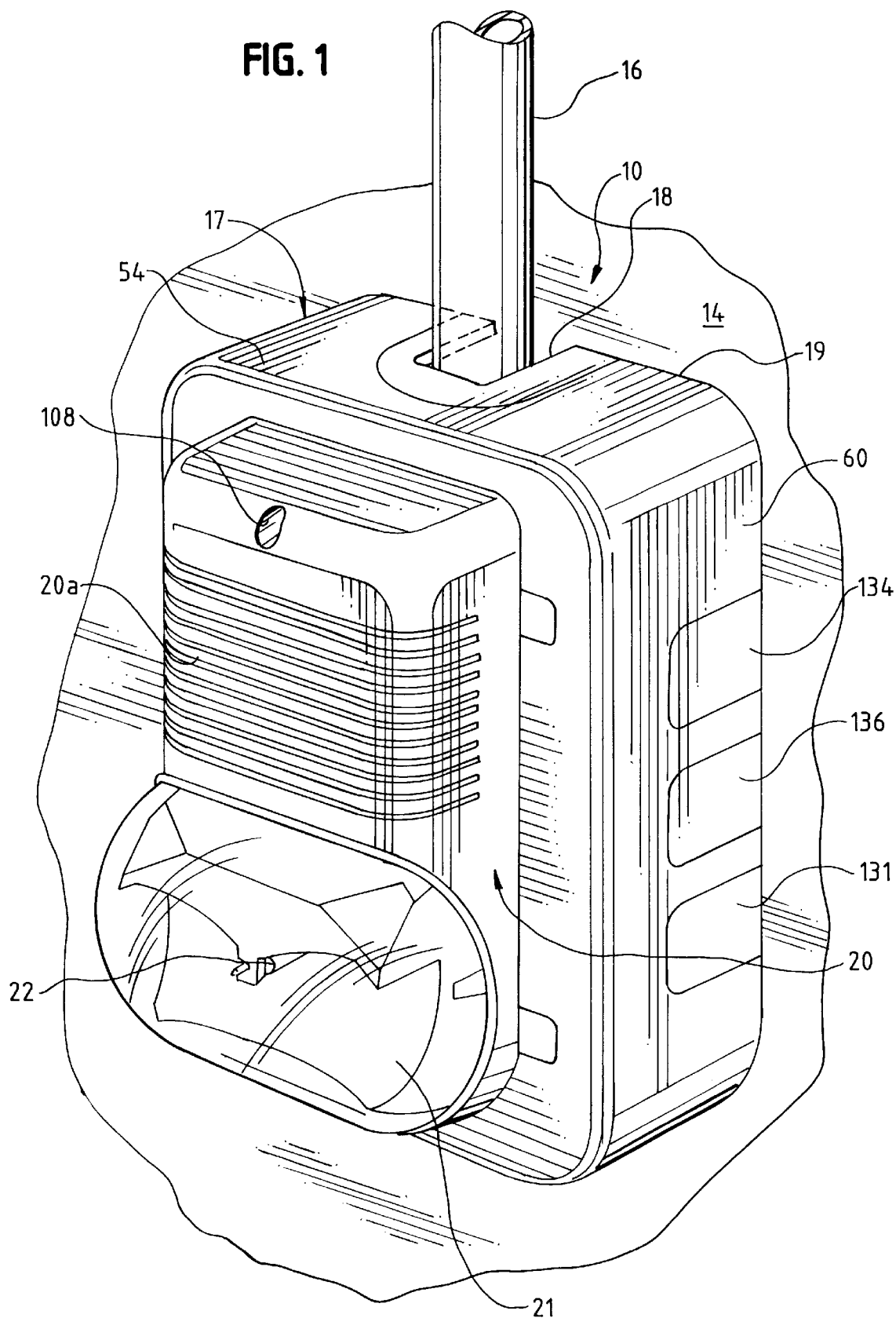
FIG. 1 is a perspective view of a cover or enclosure installed on a surface mounted junction box.

While the present invention is susceptible of embodiment in various forms, there is shown in the drawings and will hereinafter be described a presently preferred embodiment, with the understanding that the presents disclosure is to be considered as an exemplification of the invention, and is not intended to limit the invention to the specific embodiment illustrated.

FIG. 1 illustrates an alarm unit assembly 10 installed onto an electrical junction box (shown in FIG. 2) mounted to a surface 14. The junction box is connected by a conduit 16 having signal wires therein delivered into the junction box.

A cover 17 surrounds and conceals the junction box. The cover provides a slot 18 which is aligned with and closely surrounds the conduit 16. The cover extends to a surrounding edge 19 which is adjacent to the mounting surface 14.

A strobe light alarm unit 20 is mounted to the cover 17. The alarm unit includes a lens 21 covering a lamp 22. The strobe light alarm unit also includes an audible alarm 20a, in addition to the strobe light lamp 22 for signaling the hearing impaired.

Figure 2:
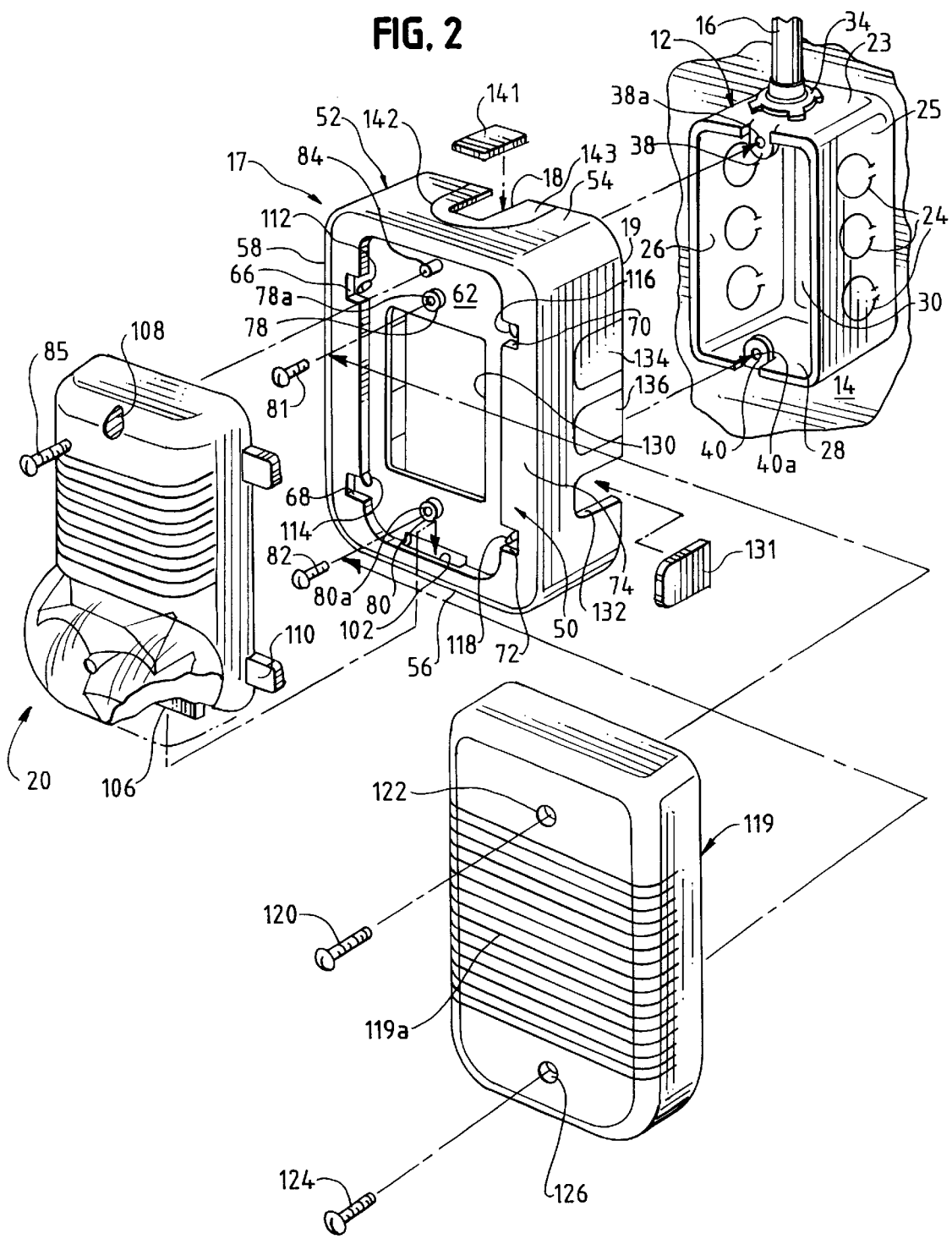
FIG. 2 is an exploded perspective view of the cover or enclosure to be assembled on the surface mounted junction block.

FIG. 2 illustrates the assembly 10 in an exploded view. An assembly (components of which are described below) is installed over and onto a surface-mounted junction box 12 which is installed onto a surface 14 such as a wall, column, ceiling, floor, or any otherwise exposed surface.

The junction box 12 is connected by at least the one conduit 16 shown in the figure as connected to a top panel 23 of the junction box 12. As is known, junction boxes include punch out panels 24 arranged on multiple sides of the junction box 12. Three such punch out panels 24, are shown on a first side panel 25 in FIG. 2. It is to be understood that other punch out panels are typically provided on the opposite, second side panel 26 and one or more punch out panels can be provided on the top panel 23 and bottom panel 28 as well. It is also conceivable that a back panel 30 could be provided with punch out panels 24 and could be connected to a conduit which extends through the plane of the surface 14 into the junction box 12.

The conduit 16 as shown is connected to the top panel 23 by way of a conventional threaded, two-piece conduit connector 34. Also, the box 12 provides bent-off tabs 38, 40, which provide threaded screw holes 38a, 40a, therethrough for threadingly receiving screws.

Mounted to and overlying the junction box 12 is the cover 17. Cover 17 has a front wall 50 and the depending perimeter skirt 52 which includes a top wall 54, a bottom wall 56 and left and right sidewalls 58, 60, respectively. The cover is Preferably a one-piece, molded plastic, color coded structure.

The front wall 50 includes a recessed central region 62 having four smaller recesses 66, 68, 70, 72. The recesses 66, 68, 70, 72 are arranged in a rectangular pattern and open to the recessed region 62, arranged recessed into a surrounding rim 74.

Screw supporting cylinders 78, 80 with through-holes 78a, 80a respectively are arranged extending through the recessed region 62. The holes 78a, 80a are aligned with the screw holes 38a, 40a.

Screws 81, 82, can extend through the holes 78a, 80a, which have plain bores. They can be screwed into the screw holes 38a, 40a to mount the cover 17 to the junction box 12. Any other types of fasteners could be used for this purpose. For example, snap fit fasteners each of which includes resilient members such as ridges, or hooks, or ribs, or similar formations, can be inserted into the screw holes a, 38a to engage therewith.

Also mounted on the recessed region 62 is a screw engaging cylinder 84. Cylinder 84 receives a screw 85 which is threadingly engageable therein to mount the strobe light unit 20 to the cover 17.

The cover 17 further provides a slot 102 formed through the recessed region 62 and into the rim 74 in a direction generally parallel to a front surface 62a of the recessed region 62. The slot 102 receives a tab 106 of the strobe light unit 20. A front portion 74a of the rim 74 thus retains the tab 106 from frontward movement (See FIG. 4). The strobe light unit 20 can therefore be easily and quickly installed to the cover by sliding the tab 106 into the slot 102 and rotating the screw 85 through an aperture 108 of the module 20 and threading it into the screw-receiving cylinder 84 of the cover 17. The unit 20 further provides extending tab portions 110 which are arranged to interfit into the smaller recesses 66, 68, 70, 72 to cover oblong screw receiving bores 112, 114, 116, 118. These bores provide an alternate means of mounting the cover to a junction box as will be described in FIG. 3.

The cover 17 provides a convenient mounting for a plurality of different types of alarm units. As illustrated in FIG. 2, an audible alarm unit 119 is shown which is mounted in a modified fashion. The alarm unit 119 includes a horn or audible signal generator 119a within the unit 119.

In the case of the audible alarm unit 119, a first screw 120 passes through an aperture 122 of the alarm unit 119 and passes through the cylinder 78 and threads into the screw hole 38a of the junction box. A second screw 124 passes through a second aperture 126 in the module 119, the cylinder 80 and threads into the screw hole 40a of the junction box. Either of the alarm units 119, 20, can be attached by using two screws or other type fasteners, or by using a single screw or fasteners and a tab-in-slot configuration as described above.

The cover 17 further includes a central opening 130 through the recessed region 62 which allows the connection of wires from the unit 20 or 119 to wires within the junction box 12 form the conduct 16. The opening 130 can be made smaller than an open face of the junction box, so that if a unit 20, 119 is removed from the cover, loose wires can be retained within the junction box by the cover.

The side walls 58, 60 of the cover 17 each include a plurality of dedicated break away areas for slots to accommodate conduits connected to the junction box 12. Particularly illustrated is a slot 132 previously covered by a removable panel 131, and two removable panels 134, 136, which are slot-shaped, such as the slot 132 and which provide alternate locations for a conduit-receiving slot. The removable panels 131, 134, 136 are arranged to align with the punch out panels 24 of the junction box 12.

On the top panel 52, as well as a bottom panel, not shown, is the first slot 18, previously covered by a removable panel 141. Slots 18 and 132 accommodate a conduit of a preselected diameter. A surrounding U-shaped gap 142 allows for removal of a U-shaped panel 143 to provide a larger opening in the top panel 52. This larger opening accommodates a larger diameter conduit or a connector.

Thus, depending on where the conduit or conduits enter the junction box 12, as well as their size, the removable panels can be displaced from either the top or side walls or bottom wall, and the cover 17 placed over the junction box allowing the conduits to be located within the slot areas and a surrounding edge 19 of the cover 17 can be placed close to or against the surface 14.

FIG. 3 illustrates the cover 17 in use with a double-wide junction box 150, a junction box which can receive two electrical fixtures. Double-wide junction boxes have screw engaging holes 152a, 158a arranged at two diagonally arranged corners, through bent tabs 152, 158.

The oval screw holes 112, 114, 116, 118 of the cover 17 are shown as being formed through oblong cylinders 160, 162, 164, 166 having plain bores, and formed on a backside of the recessed region. Two screws 168 slide through two of the oblong, plain bores, and are threadingly received into the screw holes 152a, 158a to mount the cover 17 to the junction box 150.

In general, only two screws 168 will be used and inserted through the oblong cylinders 162,166. The oblong cylinders 160, 194 would usually not be used unless a four-mounting-screw-arrangement electrical box is provided.

As stated above, alternate fasteners such as snap-fasteners can be used in lieu of the screws 168.

The cover 17 is sized to covet the junction box with the surrounding edge 19 of the cover 17 reaching the surface 14. In the illustrated example the top slot 18 fits around a top connected conduit 174 which channels wires into the junction box 150.

FIG. 4 illustrates the cover 17 installed over the junction box 150 and against the surface 14. As can be observed, the enclosure 17 covers the otherwise crude, industrial appearing junction box and closely surrounds the conduit 174.

As installed, the cover 17 clearly demarcates the junction box according to its service, such as fire alarm service, and can be color coded accordingly. For example, a red cover can be used for a fire condition, a green cover can be used for a tornado warning, and a blue cover can be used for a "take cover immediately" warning. Also, a different color can be used for a warning of a high concentration of poisonous or explosive gas. The cover 17 closely surrounds and encloses both the electrical box and the conduit(s) connected thereto to provide an architecturally pleasing appearance.

The cover 17 provides a wider and taller front surface for receiving and supporting the alarm units 20, 119 than would be otherwise provided by the electrical box 12, 150. The electrical units 20, 119 can be nested into the recessed region 62 on the front wall 50 of the cover 17. The electrical units 20, 119 do not overhang the cover. Since the cover 17 can be pressed against the surface 14, around the edge 19 at a distance from the attachment point of the cover to the junction box, it provides a more stable and secure installation of the electrical units 20, 119, than the smaller electrical box alone.

Figure 5:
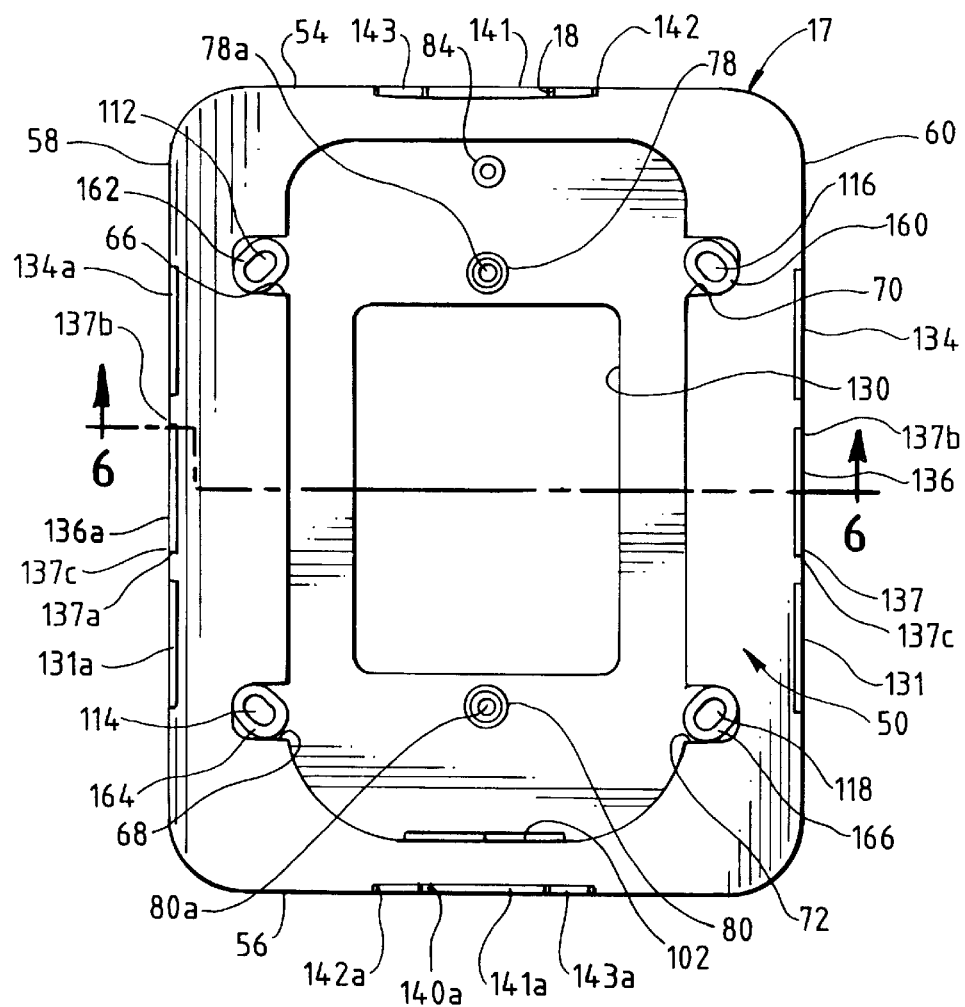
FIG. 5 is a front elevational view of the cover shown in FIG. 1.
Figure 6:
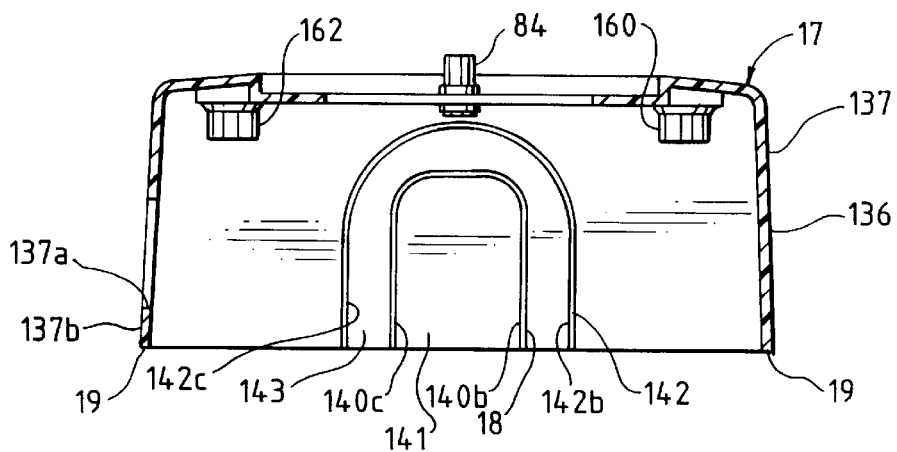
FIG. 6 is a sectional view taken generally along line 6—6 of FIG. 5.

FIGS. 5 and 6 illustrate the cover 17 and the configuration of the removable panels 131, 134, 136 on the right wall 60 and further removable panels 131a, 134a, 136a on the left wall 58. Each of the panels on the right and left walls are identically configured. For example, the removable panel 136 is defined by a partial U-shaped gap 137 through the side wall 60. The removable panel 136a is defined by an identical partial U-shaped gap 137a.

As illustrated in FIG. 6, the gaps 137, 137a, are substantially through the walls 60, 58 except for two connection pieces 137b, 137c adjacent the edge 19 of the cover 17. To remove the panels 136, 136a, the connection pieces 137b, 137c are broken by prying of the panel, rotated about the edge 19.

On both the top wall 54 and bottom wall 56 are located the removable panels 141, 141a which define respective openings 18, 140a for receiving a first size conduit. Removable U-shaped panels 143, 143a surround the openings 18, 140a and can be removed to accommodate a larger second size conduit, fitting or connector in the larger openings 142, 142a.

Similar to the side panel 136a for example, the top panels 141, 143, are partially surrounded by U-shaped gaps 18b, 143b and connected to the top wall 54 and bottom wall 56 by connection pieces 140b, 140c; 142b, 142c respectively, which are adjacent the cover edge 19. The connection pieces can be broken to free the panels from the cover by prying the panels about the edge 19. The bottom panels 141a, 143a are configured and connected identically to the top panels 18, 143.

Although U-shaped gaps are used to weaken the connection between removable panels and the sidewalls and top and bottom walls, other forms of intentionally weakening this connection can be used such as cuts, grooves or perforations.

Figure 7:
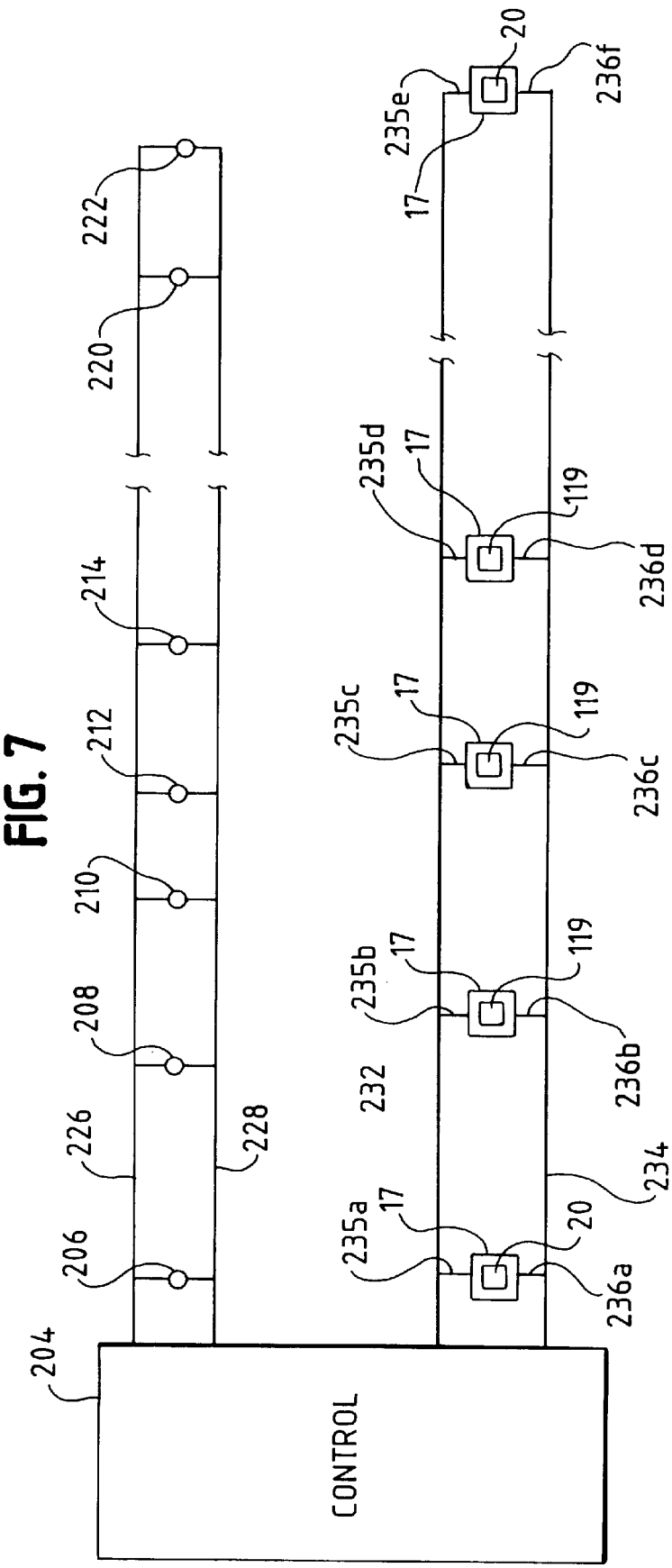
FIG. 7 is a schematic diagram of a system incorporating the enclosures as in FIG. 1.

FIG. 7 illustrates an alarm system 200 for a facility such as a warehouse. The system 200 includes a control unit 204 which incorporates a computer or a control console in a central location.

A plurality of condition sensors 206, 208, 210, 212, 214, 220, 222 can be connected to detector electrical communication lines 226, 228. The sensors can be of one type, such as smoke detectors, or can be a plurality of different detectors, such as smoke detectors, motion sensors, etc. The sensors are advantageously spaced apart around an inside of the facility.

A plurality of alarm units 20, 119 is connected to the control unit 204 via two alarm electrical bus lines 232, 234 and branch wires 235a–e, 236a–e. The alarm units can be a mixed assortment of the two unit types 20, 119, or all one type or can include other types as well. The bus lines 232, 234 and branch lines 235a–e, 236a–e are carried in conduits which terminate in junction boxes 12, 150, as shown for example in FIGS. 2 and 3. A plurality of the alarm units 20, 119 can incorporate covers 17 to architecturally integrate the alarm system into the facility and provide the other advantages enumerated above. The alarm units are advantageously spaced apart around the facility.

The control unit 204 can transmit an alarm signal to all alarms on the bus lines 232, 234, or the bus lines can be configured so that the control unit 204 can trigger selected alarms.

From the foregoing, it will be observed that numerous modifications and variations can be effected without departing from the spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

The invention claimed is:

1. A cover for overfitting a surface mounted electrical junction box, said electrical junction box having an opening front face with fixture mounting screw holes adjacent the open front face, and having connected thereto at least one conduit, said cover comprising:

a front wall and a surrounding perimeter skirt extending therefrom, said perimeter skirt having a depth at least as great as a depth of the electrical junction box, said front wall and said perimeter skirt defining a cavity sized to receive the junction box into said cavity and to conceal the electrical junction box when said cover overfits the junction box, said front wall having screw-receiving holes aligned to register with the fixture mounting screw holes.

2. A cover for overfitting a surface mounted electrical junction box, said electrical junction box having an open front face with fixture mounting screw holes adjacent the open front face, and having connected thereto at least one conduit, said cover comprising:

a front wall and a surrounding perimeter skirt extending therefrom, said perimeter skirt having a depth at least as great as a depth of the electrical junction box, said front wall and said perimeter skirt defining a cavity sized to conceal the electrical junction box when said cover overfits the junction box, said front wall having screw-receiving holes aligned to register with the fixture mounting screw holes, wherein said perimeter skirt has a conduit access slot for receiving a conduit connected to the junction box when said cover overfits the junction box.

3. A cover for overfitting a surface mounted electrical junction box, said electrical junction box having an open front face with fixture mounting screw holes adjacent the open front face, and having connected thereto at least one conduit, comprising:

a front wall and a surrounding perimeter skirt extending therefrom, said perimeter skirt having a depth at least as great as a depth of the electrical junction box, said front wall and said perimeter skirt defining a cavity sized to conceal the electrical junction box when said cover overfits the junction box, said front wall having screw-receiving holes aligned to register with the fixture mounting screw holes, wherein said cover includes a plurality of break away areas removable to open access slots for conduits, and wherein said access slots are aligned with conduit punch out panels located in the walls of the junction box.

4. A cover for overfitting a surface mounted electrical junction box, said electrical junction box having an open front face with fixture mounting screw holes adjacent the open front face, and having connected thereto at least one conduit, said cover comprising:

a front wall and a surrounding perimeter skirt extending therefrom, said perimeter skirt having a depth at least as great as a depth of the electrical junction box, said front wall and said perimeter skirt defining a cavity sized to conceal the electrical junction box when said cover overfits the junction box, said front wall having screw-receiving holes aligned to register with the fixture mounting screw holes, wherein said perimeter skirt comprises a first removable panel sized to open a first conduit access slot through said perimeter skirt for accommodating a first size conduit connected to the junction box when said cover overfits the junction box; and a second removable panel surrounding said first removable panel, said second removable panel removable to open a larger second conduit access slot through said perimeter skirt for accommodating a second size conduit connected to the junction box, when said cover overfits the junction box.

5. A cover for overfitting a surface mounted electrical junction box, said electrical junction box having an open front face with fixture mounting screw holes adjacent the open front face, and having connected thereto at least one conduit, said cover comprising:

a front wall and a surrounding perimeter skirt extending therefrom, said perimeter skirt having a depth at least as great as a depth of the electrical junction box, said front wall and said perimeter skirt defining a cavity sized to conceal the electrical junction box when said cover overfits the junction box, said front wall having screw-receiving holes aligned to register with the fixture mounting screw holes.

wherein said perimeter skirt comprises a removable panel, removable to form a conduit access slot, said removable panel at least partially defined by a gap through said perimeter skirt.

6. The cover according to claim 1, wherein said front wall comprises a recessed region for mounting an electrical device to said cover.

7. An electric device assembly for mounting to a surface mounted electrical junction box, the junction box having an open front face thereof, the assembly comprising:

a cover mountable to an electrical junction box and sized to receive the electrical junction box within the cover and to enclose the junction box against the surface upon which the junction box is mounted, said cover having a front wall and a surrounding perimeter skirt extending to the surface, when so mounted to the junction box, said cover having an opening through said front wall; and an electrical device mounted to said front wall and covering said opening, said electrical device having electrical connections which are connectable through said opening.

8. The assembly according to claim 7, wherein the junction box includes fixture mounting screw holes adjacent to the open front face of the junction box, and wherein said cover has screw-receiving holes aligned to register with the fixture mounting screw holes of the junction box, the screw-receiving holes and the fixture mounting screw holes for receiving a plurality of screws for mounting the cover to the junction box.

9. The assembly according to claim 7, wherein said cover includes at least one access slot through said perimeter skirt to receive therein a conduit connected to the junction box.

10. An electric device assembly for mounting to a surface mounted electrical junction box, the junction box having an open front face thereof, the assembly comprising:

a cover mountable to an electrical junction box and sized to enclose the junction box, said cover having a front wall and a surrounding perimeter skirt extending to the surface, when so mounted to the junction box, said cover having an opening through said front wall; and an electrical device mounted to said front wall and covering said opening, said electrical device having electrical connections which are connectable through said opening, wherein said cover includes at least one access slot through said perimeter skirt to receive therein a conduit connected to the junction box, and wherein said cover includes areas having intentionally weakened perimeters wherein the areas are removable to open further access slots for conduits, wherein said further access slots are aligned with conduit attachment locations on the junction box.

11. The assembly according to claim 7, wherein said electrical device is mounted to said front wall by at least one screw, wherein said front wall comprises a screw-receiving and engaging region for receiving said screw.

12. The assembly according to claim 7, wherein said electrical device is connected to said front wall by one screw and said electrical device includes a retaining tab, and said front wall includes a slot for receiving said retaining tab.

13. The assembly according to claim 12, wherein said retaining tab extends from a bottom wall of said electrical device outwardly in a direction generally parallel to said front wall; and said front wall includes a recess for receiving said tab, said slot being located in said recess and extending in a direction generally parallel to said front wall.

14. The assembly according to claim 7, wherein said cover is composed of plastic.

15. The assembly according to claim 7, wherein said electrical device and said front wall include mutually engaging locators for aligning said electrical device onto said front wall.

16. The assembly according to claim 15, wherein said locators comprise recesses in said front wall and tabs on said electrical device which engage said recesses.

17. The assembly according to claim 16, wherein the junction box includes fixture mounting screw holes adjacent to the open front face of the junction box, and wherein said cover has screw-receiving holes aligned to register with the fixture mounting screw holes of the junction box, the screw-receiving holes and the fixture mounting screw holes for receiving a plurality of screws for mounting the cover to the junction box, wherein said screw-receiving holes of said cover are located within said recesses and said tabs cover said screw-receiving holes.

18. The assembly according to claim 7, wherein said electrical device includes a lamp for illuminating an area surrounding said electrical device.

19. The assembly according to claim 7, wherein said electrical device includes an audible signal generator.

20. An electrical unit mounting system mountable to a surface mounted electrical box the system comprising:
   a cover with a front panel that has a depressed body receiving region formed therein and a surrounding perimeter skirt oriented generally perpendicular to the front panel wherein the cover defines an open interior region, wherein said region is sized to receive a surface mounted electrical box;
   elements for attaching the cover to the electrical box wherein when so attached, the cover surrounds and conceals the box; and
   an electrical unit having a configuration slidably receivable, at least in part, in the body receiving region wherein the electrical unit is carried, at least in part by the cover.

21. The electrical unit mounting system according to claim 20 wherein said electrical box includes at least one fixture mounting screw hole and, said elements comprise at least one snap fit fastener member which engages said screw hole by forced sliding insertion of a portion of said fastener member through said screw hole.

22. The mounting system according to claim 20, wherein the electrical box includes fixture mounting screw holes, and said elements include screw receiving holes alignable with fixture mounting screw holes of the electrical box; and said electrical unit covers said screw receiving holes when said electrical box is slid into said body receiving region.

23. The mounting system according to claim 21, wherein said body receiving region comprises a generally rectangular recess with four contiguous small recesses arranged in a rectangular pattern and open into said rectangular recess, said screw receiving holes arranged within said four smaller recesses, and said rectangular pattern at least partially matching a rectangular layout of fixture mounting screw holes of the electrical box; and said electrical unit includes tabs arranged extending therefrom which interfit into said small recesses to cover said screw receiving holes, when said electrical unit is slid into said body receiving region.

24. The mounting system according to claim 20, wherein the electrical box includes fixture mounting screw holes, and said elements include screw receiving holes alignable with fixture mounting holes of the electrical box; and said electrical unit includes unit mounting screw holes aligned with said screw receiving holes; and screws which are placed through said unit mounting screw holes and said screw receiving holes and engage said fixture mounting screw holes to mount said electrical unit and cover to said electrical box.

25. The mounting system according to claim 20, further comprising:
   a plurality of additional surface mounted electrical boxes;
   a plurality of branch conduits, each connected to one of said additional electrical boxes;
   wires terminating in said additional electrical boxes and carried within said branch conduits; and
   a plurality of additional covers each having a font wall and a perimeter skirt which define a cavity sized to receive a surface mounted electrical box, said plurality of additional electrical boxes.

26. The system according to claim 25, wherein each of said additional covers includes a surrounding edge and each said additional cover is sized to press said surrounding edge to a surface which carries the respective surface mounted electrical box when said additional cover is mounted to said electrical box.

27. The system according to claim 25, further comprising a plurality of alarm units, one of each mounted to each of said additional covers, wherein said plurality of alarm units includes audible alarms and strobe light alarms.

28. The system according to claim 25, further comprising a plurality of alarm units, wherein one of each is mounted to each of said additional covers, wherein said plurality of alarm units comprise first alarm units and second alarm units for two different emergency services respectively, and said plurality of additional covers corresponding to said first ans second alarm units are color coded a first color and a different second color respectively corresponding to the emergency service.

29. The system according to claim 28 wherein the two emergency services are selected from the group consisting of: fire alarm, tornado alarm, and take cover immediately alarm.

30. The system according to claim 20, further comprising:
   a plurality of conduits carrying wires, a plurality of additional electrical boxes mounted against surfaces of a structure and connected to the conduits, the wires extending;
   a plurality of additional covers, each cover for mounting to one of the plurality of additional electrical boxes, each of said additional covers shaped to surround and conceal one of the plurality of additional electrical boxes, each of said additional covers having a gap for passing an electrical conductor therethrough; and
   a plurality of additional electrical units, each additional electrical unit for mounting to one of said additional covers, said additional electrical unit being electrically connectable by a conductor through said gap of said one of said additional covers.

31. The system according to claim 30, wherein each of said additional covers includes a surrounding edge and each said additional cover is sized to press said surrounding edge to the surface which carries the respective electrical box when said additional cover is mounted to said additional electrical box.

32. The system according to claim 31, wherein each of the additional electrical boxes includes fixture mounting holes and each of said plurality of additional covers includes fastener receiving holes aligned with respective fixture mounting holes of one of said additional electrical boxes, for mounting each said additional cover to said one of said additional electrical boxes.

33. The system according to claim 30, wherein said plurality of additional electrical units includes audible alarm units and strobe light alarm units.

34. The electrical unit mounting system according to claim 20, wherein said perimeter skirt comprises a plurality of side panels.

* * * * *

UNITED STATES PATENT AND TRADEMARK OFFICE
CERTIFICATE OF CORRECTION

PATENT NO. : 5,914,665

DATED : June 22, 1999

INVENTOR(S): Edward Thorp et al

It is hereby certified that error appear(s) in the above-identified patent and that said Letters Patent are hereby corrected as shown below:

In Col. 2, line 6, "ants" should be --and--;

In Col. 3, line 38, "Preferably" need not be capitalized;

In Col. 4, line 21, "fasteners" should be singular;

In Col. 4, line 66, "194" should be --164--;

In Col. 6, line 39 (claim 1) "opening" should be --open--;

In Col. 7, line 5, after "conduit," insert --said cover--.

In Col. 10, line 3, "font wall" should be --front wall--;

In Col. 10, line 22, last line, "ans" should be --and--;

UNITED STATES PATENT AND TRADEMARK OFFICE
CERTIFICATE OF CORRECTION

PATENT NO. : 5,914,665
DATED : June 22, 1999
INVENTOR(S) : Edward Thorp et al

It is certified that error appears in the above-identified patent and that said Letters Patent is hereby corrected as shown below:

In Col. 10, line 34, after "extending", insert --into the additional electrical boxes.

Signed and Sealed this

Twenty-eighth Day of December, 1999

Attest:

Q. TODD DICKINSON

Attesting Officer    Acting Commissioner of Patents and Trademarks